United States Patent
Padovani et al.

(10) Patent No.: US 11,820,510 B2
(45) Date of Patent: Nov. 21, 2023

(54) QUICKLY ADJUSTABLE FAIL-SAFE LINK BAR ASSEMBLIES ESPECIALLY USEFUL FOR CONNECTING STRUCTURAL COMPONENTS OF AN AIRCRAFT

(71) Applicant: EMBRAER S.A., São José dos Campos-SP (BR)

(72) Inventors: André Padovani, São José dos Campos-SP (BR); Jonathas Fellipe Costa Gomes, São José dos Campos-SP (BR); Pedro Henrique Barros Soares, São José dos Campos-SP (BR)

(73) Assignee: YABORÃ INDUSTRIA AERONAUTICA S.A., São José dos Campos (BR)

( * ) Notice: Subject to any disclaimer, the term of this patent is extended or adjusted under 35 U.S.C. 154(b) by 933 days.

(21) Appl. No.: 16/807,521

(22) Filed: Mar. 3, 2020

(65) Prior Publication Data

US 2020/0307764 A1    Oct. 1, 2020

Related U.S. Application Data

(60) Provisional application No. 62/823,915, filed on Mar. 26, 2019.

(51) Int. Cl.
*B64C 7/00* (2006.01)
*F16M 13/02* (2006.01)
(Continued)

(52) U.S. Cl.
CPC ............... *B64C 7/00* (2013.01); *B64C 1/22* (2013.01); *F16C 11/045* (2013.01); *F16M 13/02* (2013.01);
(Continued)

(58) Field of Classification Search
CPC . B64D 27/26; B64D 2027/262; F16C 11/045; Y10T 403/32606;
(Continued)

(56) References Cited

U.S. PATENT DOCUMENTS

| | | | | |
|---|---|---|---|---|
| 1,528,325 A | * | 3/1925 | Gledhill | E02F 3/7636 172/793 |
| 2,523,321 A | * | 9/1950 | Nelson | F16C 11/0619 280/93.511 |

(Continued)

FOREIGN PATENT DOCUMENTS

| | | | | |
|---|---|---|---|---|
| FR | 3060679 A1 | * | 6/2018 | ............... B64C 3/18 |
| FR | 3088902 A1 | * | 5/2020 | |
| KR | 20110034051 A | * | 4/2011 | |

*Primary Examiner* — Jonathan P Masinick
(74) *Attorney, Agent, or Firm* — NIXON & VANDERHYE P.C.

(57) ABSTRACT

Link bar assemblies are provided to connect adjacent structural components (e.g., components of an aircraft such as connecting an underwing engine to the wing structure) having respective connection lugs. The link bar assemblies will include a link bar having opposed terminal ends which include circular bearings, bushings operatively received by the circular bearings of the link bar, and a bolt and pin assembly inserted through the bushings to connect the terminal ends of the link bar to the respective connection lugs of the adjacent structural components. At least one of the bushings includes a multi-faceted flange and defines an eccentric aperture (e.g., an elliptical aperture having major and minor axes) such that rotation of the bushing allows the eccentric aperture to become aligned with the mounting opening of a respective connection lug.

18 Claims, 3 Drawing Sheets

(51) Int. Cl.
   *B64C 1/22*     (2006.01)
   *F16C 11/04*    (2006.01)
   *B64D 27/26*    (2006.01)

(52) U.S. Cl.
   CPC ....... *B64D 27/26* (2013.01); *Y10T 403/32893* (2015.01)

(58) Field of Classification Search
   CPC ..... Y10T 403/32819; Y10T 403/32844; Y10T 403/32861; Y10T 403/32868; Y10T 403/32893; Y10T 403/32909
   See application file for complete search history.

(56) References Cited

U.S. PATENT DOCUMENTS

| | | | | |
|---|---|---|---|---|
| 2,529,955 A * | 11/1950 | Morley | ........ | F02C 7/20 60/797 |
| 3,638,980 A * | 2/1972 | Kleinhenn | ........ | F16B 39/08 411/320 |
| 4,943,013 A * | 7/1990 | Kapala | ........ | F16B 39/10 244/54 |
| 5,649,417 A * | 7/1997 | Hey | ........ | B64D 27/26 244/54 |
| 5,860,623 A * | 1/1999 | Dunstan | ........ | B64D 27/26 60/797 |
| 6,330,995 B1 * | 12/2001 | Mangeiga | ........ | B64D 27/26 244/54 |
| 8,596,603 B2 * | 12/2013 | Gallet | ........ | F02C 7/20 244/54 |
| 9,321,522 B2 * | 4/2016 | Blades | ........ | F16C 11/02 |
| 9,346,501 B2 * | 5/2016 | Johannsen | ........ | B62D 55/21 |
| 9,399,520 B2 * | 7/2016 | Cassagne | ........ | F16C 11/045 |
| 9,592,917 B2 * | 3/2017 | Cassagne | ........ | B64D 27/12 |
| 10,577,114 B2 * | 3/2020 | Geliot | ........ | B64D 27/18 |
| 10,941,675 B2 * | 3/2021 | Silva | ........ | F16B 39/10 |
| 11,408,542 B2 * | 8/2022 | Shaner | ........ | F16L 19/06 |
| 2006/0133890 A1 * | 6/2006 | Etoile | ........ | F16C 23/10 403/122 |
| 2009/0269133 A1 * | 10/2009 | Van Amelsfoort | ... | E02F 3/3604 403/408.1 |
| 2013/0149023 A1 * | 6/2013 | Wiecko | ........ | F16C 11/0695 403/79 |
| 2015/0166190 A1 * | 6/2015 | Cassagne | ........ | B64D 27/26 403/57 |
| 2015/0167726 A1 * | 6/2015 | Cassagne | ........ | F16B 39/24 411/136 |
| 2021/0163115 A1 * | 6/2021 | Goupil | ........ | B64C 1/06 |
| 2022/0333643 A1 * | 10/2022 | Harleman | ........ | F16C 17/02 |

* cited by examiner

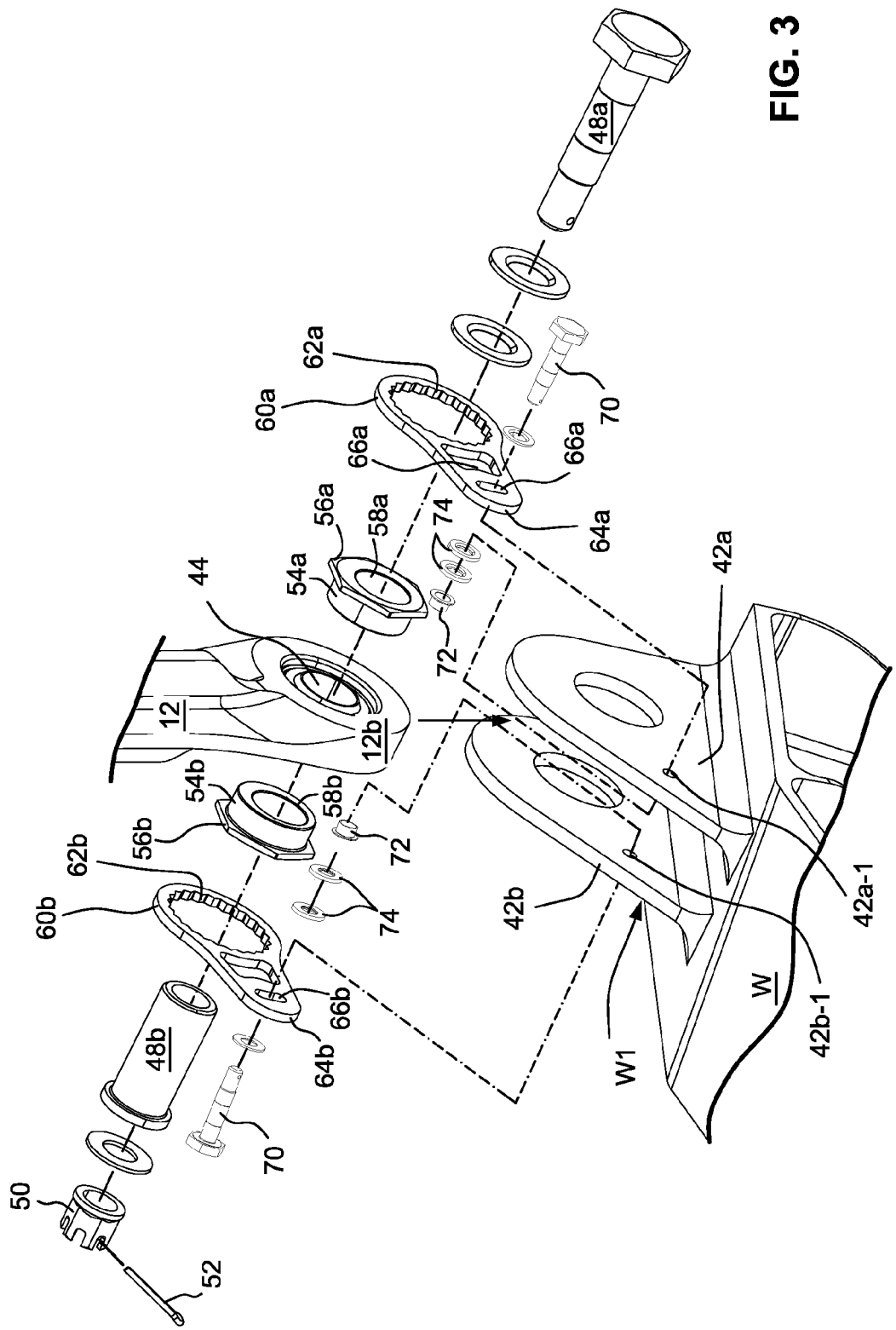

QUICKLY ADJUSTABLE FAIL-SAFE LINK BAR ASSEMBLIES ESPECIALLY USEFUL FOR CONNECTING STRUCTURAL COMPONENTS OF AN AIRCRAFT

CROSS-REFERENCE TO RELATED APPLICATION

This application is based on and claims domestic priority benefits of U.S. Provisional Application Ser. No. 62/823,915 filed on Mar. 26, 2019, the entire contents of which are expressly incorporated hereinto by reference.

FIELD

The embodiments disclosed herein relate generally to link bar assemblies that are especially useful to connect structural components of an aircraft due to the quick adjustment and fail-safe capabilities thereof.

BACKGROUND

Link bars are widely used in aircraft designs to allow for axial load transfer (attachment) between adjacent structural parts, e.g., primary and secondary structural parts. Link bars can therefore be used in several component assemblies in an aircraft, such as engine mounts, interior monument attachments and the like.

The typical link bar employed in aircraft designs is a commercially available element that is found in a wide range of sizes and a considerable variety of materials. The implementation of this type of element in primary load paths in a damage-tolerant aircraft project therefore raises some issues. For example, due to problems related to airworthiness, it is necessary for the structure to show damage tolerance, i.e., when a failure occurs it must not be catastrophic. In other words, when a load path element is prone to be susceptible to fatigue failures, it must be considered broken in an analysis for a given condition, where the remaining structure must then withstand the normal loads associated with a regular flight. These requirements usually drive the design for stronger (and disadvantageously heavier) parts once there is necessarily some redundancy involved.

The bearings of a link bar are typically fixed to the bar through threads which allow for length adjustment. The larger the load to be transferred the more torque is necessary to be applied to the nuts in order to lock the threads to avoid loss of torque and loosened parts. Some anti-rotational measures is also recommended for the nuts. In some critical applications, the adjustment process for such conventional link bars is therefore iterative and can take several hours to positionally implement.

It would therefore be highly desirable if link bar assemblies could be provided which are fail-safe and quickly adjustable. It is towards providing such a solution that the embodiments disclosed herein are directed.

SUMMARY

Generally, the embodiments disclosed herein are directed toward link bar assemblies that may be employed satisfactorily in certain specific applications where transferred loads are high, compression loads are predominant and/or lengthwise adjustment of the link bar between attached structural components are necessary, e.g., to join adjacent structural components associated with an aircraft, such as mounting underwing engines to the wing structure.

According to certain embodiments, link bar assemblies are provided to connect adjacent structural components having connection lugs defining respective mounting openings, whereby the link bar assembly comprises a link bar having opposed terminal ends which include circular bearings, bushings operatively received by the circular bearings of the link bar, and a bolt and pin assembly inserted through the bushings to connect the terminal ends of the link bar to the respective connection lugs of the adjacent structural components. At least one of the bushings includes a multi-faceted flange and defines an eccentric aperture (e.g., an elliptical aperture having major and minor axes) such that rotation of the bushing allows the eccentric aperture to become aligned with the mounting opening of a respective connection lug.

Some embodiments will therefore include at least one lock ring having an interior circular toothed surface to engage with the multi-faceted flange of the at least one bushing and thereby positionally restrain the bushing with the multi-faceted flange from rotating. The lock ring may also include a radially extending lobe which defines a locking aperture that is alignable with a receiving aperture defined by the respective connection lug, and a locking bolt assembly operatively inserted in the locking and receiving apertures to positionally lock the lock ring and the at least one bushing relative to the respective connection lug.

As disclosed herein, some embodiments may include an opposed pair of the bushings wherein each of the opposed pair of bushings includes a multi-faceted flange and defines an eccentric aperture. A pair of lock rings may therefore be provided according to such embodiments whereby each such lock ring includes the interior circular toothed surface for engagement with the multi-faceted flange of a respective on of the bushings.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

FIG. 3 is a detailed perspective view of the lower coupling associated with the link bar assembly depicted in FIG. 1.

DETAILED DESCRIPTION OF EMBODIMENTS

Figure 1:
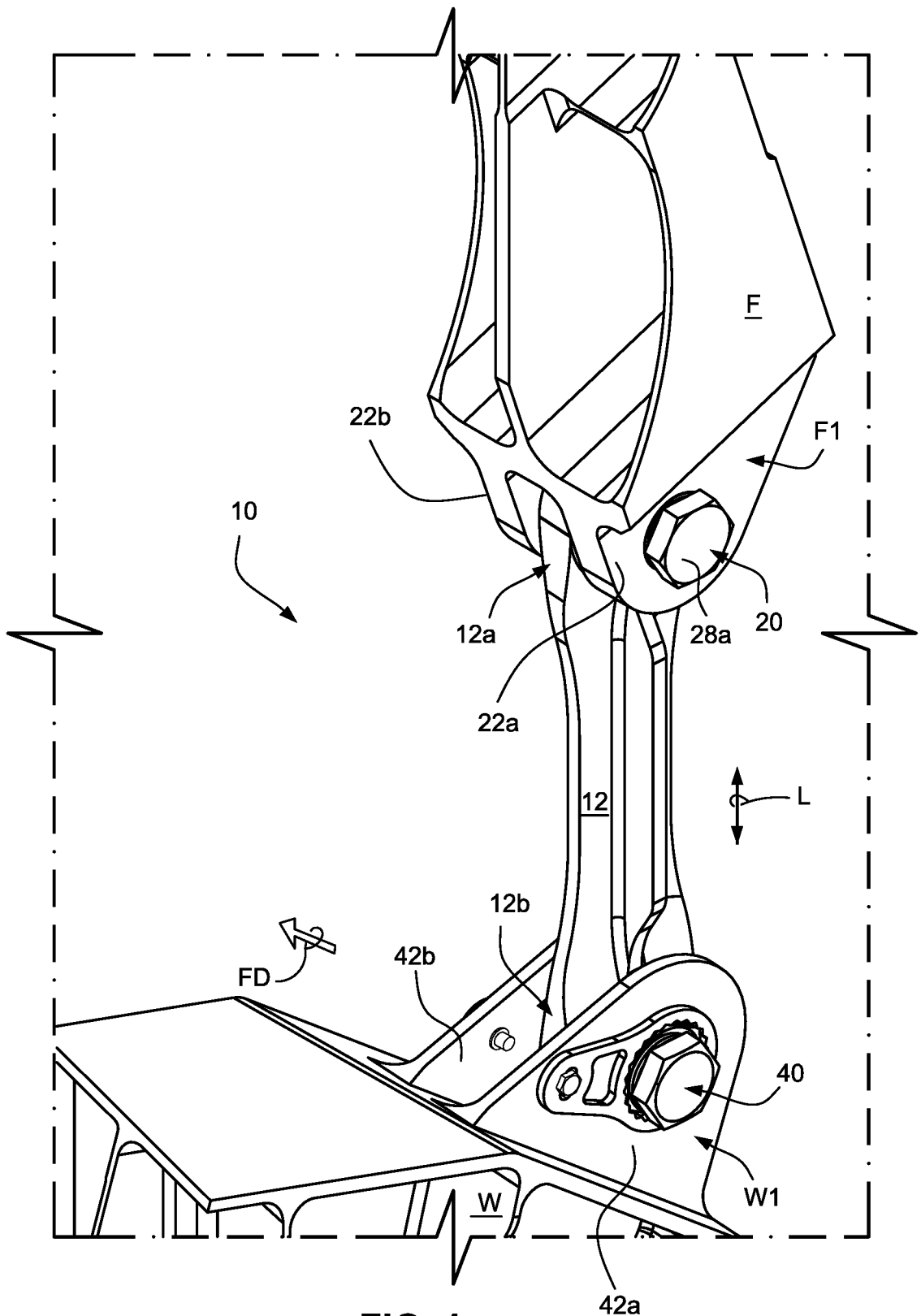
FIG. 1 is a perspective view of a link bar assembly in accordance with an embodiment of the invention.

Accompanying FIG. 1 depicts a link bar assembly 10 in accordance with the present invention installed between structural mounting flanges F1, W1 associated with aircraft structures associated with F and W structural components relative to the flight direction FD of an aircraft. As is depicted, the link bar assembly 10 is generally comprised of an axially elongate link bar 12 which in the embodiment depicted has a cruciform (+) cross-sectional shape which extends along an axis z transverse to the flight direction axis x. The link bar 12 includes upper and lower mounting assemblies 20, 40 at each terminal end 12a, 12b which serve to operatively connect the link bar 12 to the structural flanges F1 and W1 of the structures F and W, respectively.

Figure 2:
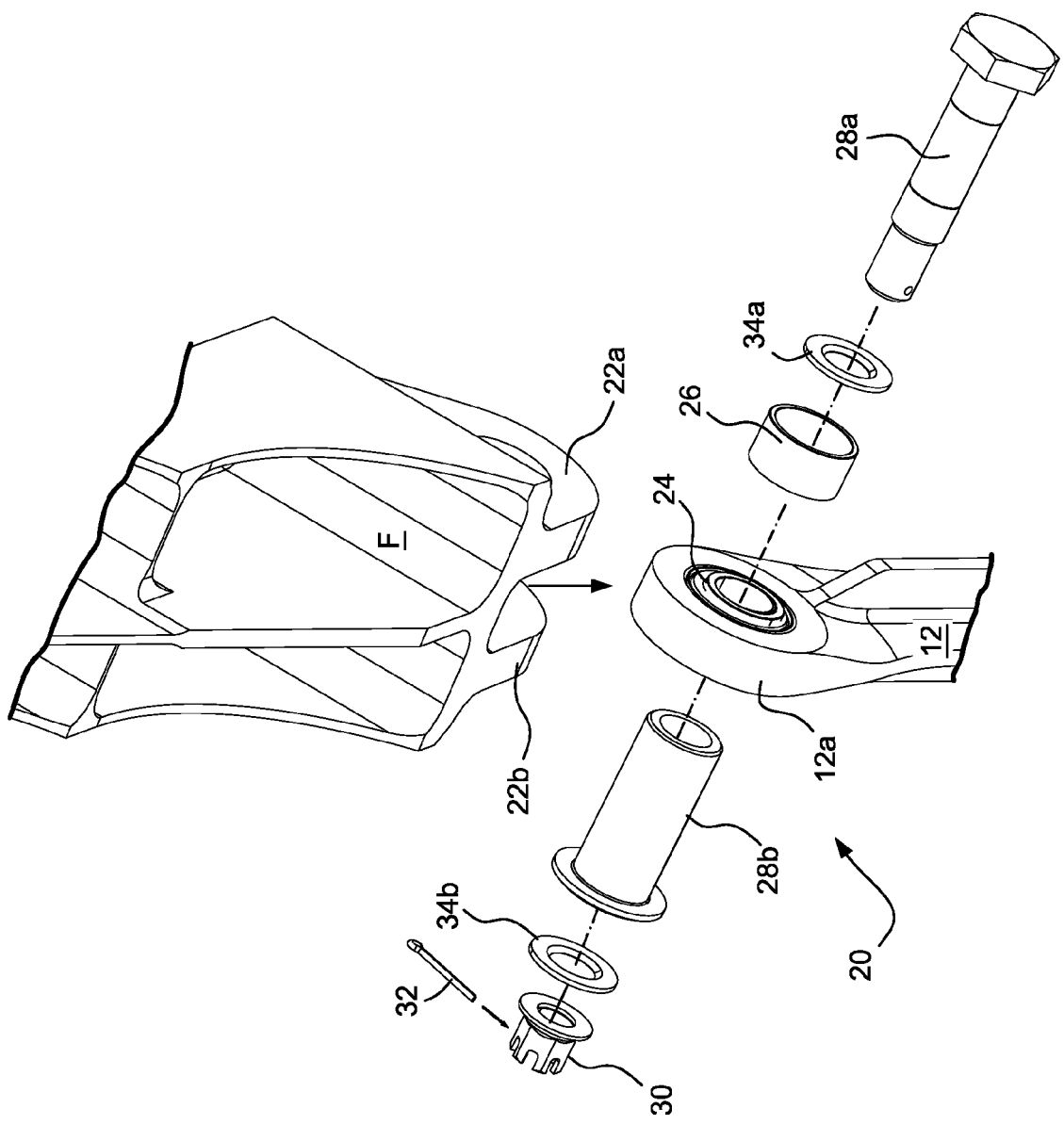
FIG. 2 is a detailed perspective exploded view of the upper coupling associated with the link bar assembly shown in FIG. 1.

The upper and lower mounting assemblies 20, 40 that operatively connect the link bar 12 to the upper and lower mounting flanges F1, W1, respectively, are depicted in greater detail in accompanying FIGS. 2 and 3. In this regard, it will be observed that each of the upper and lower mounting flanges F1, W1 include a spaced apart pair of connection lugs 22a, 22b and 42a, 44b which receive therebetween the terminal ends 12a, 12b, respectively, of the link bar 12. Each of the connection lugs 22a, 22b and 42a, 42b defines a circular opening that is respectively coaxially aligned with the circular bearing 24, 44 in the terminal ends 12a, 12b of the link bar 12.

As is perhaps better shown in FIG. 2, the upper mounting assembly 20 includes cylindrical bushing 26 received within the circular bearing 24 and which in turn receives an elongate threaded fail-safe bolt 28a and an elongate fail-safe hollow pin 28b sleeved over the bolt 28a. A castle nut 30 may thus be threaded over the terminal end of the bolt 28a so that a conventional cotter pin 32 can be inserted through the hole at the end of the bolt 28a. As is conventional, the individual legs of the cotter pin 32 can therefore be bent and engaged with the castle nut 30 so as to prevent the nut 30 from being back-threaded and thereby loosened during use. Suitable washers 34a, 34b may be positioned against the hex-head of the bolt 28a and the flange of the pin 28b.

In use, the lower mounting assembly 40 may be assembled following assembly of the upper mounting assembly 20 as described above to connect the terminal end 12a of the link bar 12 to the connection lugs 22a, 22b of the mounting flanges F1 associated with the structural component F. As is perhaps best shown in FIG. 3, the lower mounting assembly 40, like the upper mounting assembly 20, is similarly provided with an elongate fail-safe threaded bolt 48a, an elongate fail-safe hollow pin 48b sleeved over the shank of the bolt 48a, a castle nut 50 threaded over the terminal end of the bolt 48a, and a conventional cotter pin 52 inserted through the hole at the end of the bolt 48a and bent to prevent back-threading of the castle nut 50.

Important to the embodiment of the invention described herein, however, the lower mounting assembly 40 includes a pair of cylindrical adjustment bushings 54a, 54b each of which includes a multi-faceted adjustment flange 56a, 56b and a symmetrical non-circular aperture 58a, 58b. The apertures 58a, 58b are preferably elliptically shaped having major and minor axes. The adjustment bushings 54a, 54b are therefore positional in opposition to one another within the circular bearing 44 such that the multi-faceted adjustment heads 56a, 56b are positioned against a respective one of the connection lugs 42a, 42b. In the embodiment depicted, the adjustment heads have a hexagonal faceted configuration, but more or less facets may be provided as may be desired for the range of positional adjustment required.

During installation, the adjustment heads 56a, 56b may be rotated about the bushings 54a, 54b until the non-circular apertures thereof are sufficiently aligned with one another and the circular openings of the connection lugs 44a, 44b to allow the fail-safe bolt 48a to be inserted through such openings so that the pin 48b can be sleeved of the shank of the bolt 48a. Those in this art will appreciate that during installation and assembly, the non-circular openings of bushings 58a, 58a may not be sufficiently aligned with one another and the circular openings of the connection lugs 44a, 44b due to the non-circular apertures thereof. Thus, by selectively turning the adjustment flanges 56a and/or 56b, a greater area of the respective apertures can be presented until such time that the bolt 48a and pin 48b can be inserted through the circular openings of the connection lugs 44a, 44b and the non-circular apertures of the bushings 54a, 54b. Such adjustment will therefore cause the effective length L (see FIG. 1) of the link bar 12 to change somewhat so as to allow quick adjustment of the distance between the structural components F and W being connected together and thereby allow accommodation of assembly tolerances in the z axis.

Once the bushings 54a, 54b have been positioned to allow assembly of bolt 48a and pin 48b as described above, respective, lock rings 60a, 60b may be installed. As is shown in FIG. 3, each of the lock rings 60a, 60b includes an interior circular toothed surface 62a, 62b that allows virtually any number of positional dispositions relative to the multi-faceted flanges 58a, 58b of the bushings 54a, 54b, respectively, in dependence upon the number of teeth formed thereon. By way of example, the circular tooted surfaces 62a, 62b may be provided with 360 teeth to allow for a one degree positional change. Greater or lesser number of teeth may of course be provided. The toothed surfaces 62a, 62b may therefore be engaged with the multi-faceted flanges 58a, 58b so as to position the radially extending lobes 64a, 64b and present the locking apertures 66a, 66b formed in such lobes 64a, 64b in alignment with the receiving apertures 42a-1, 42b-1 of the flanges 42a, 42b, respectively. A threaded bolt 70 and nut 72 assembly with associated washers 74 may then be inserted through such aligned apertures, 66a, 66b and 42a-1, 42b-1 and threadably connected so as to positionally lock the lock rings 60a, 60b and thereby prevent rotational movement of the bushings 54a, 54b.

Those in this art will recognize that the embodiment disclosed herein above may be modified in several respects. For example, the link bar 12 may take any desired cross-sectional configuration and does necessarily need to be axially elongate, but could be angularly bent so that the terminal ends 12a, 12b are disposed at a relative angular position (e.g., up to about 90°) relative to one another. Moreover, more than a single link bar 12 and its associated mounting assemblies may be provided. Additionally or alternatively, each of the terminal ends of the link bar 12 may be provided with adjustable bushings and lock rings and/or the adjustable bushings and lock rings may be provided on the upper mounting assembly rather than the lower mounting assembly as shown in the embodiment disclosed herein.

Therefore, while reference is made to a Once the particular embodiment of the invention, various modifications within the skill of those in the art may be envisioned. Therefore, it is to be understood that the invention is not to be limited to the disclosed embodiment, but on the contrary, is intended to cover various modifications and equivalent arrangements included within the spirit and scope thereof.

What is claimed is:

1. A link bar assembly to connect adjacent structural components having connection lugs defining respective mounting openings, the link bar assembly comprising:
   a link bar having opposed terminal ends which include circular bearings;
   bushings operatively received by the circular bearings of the link bar; and
   a bolt and pin assembly inserted through the bushings to connect the terminal ends of the link bar to the respective connection lugs of the adjacent structural components, wherein at least one of the bushings includes a multi-faceted flange and defines an eccentric aperture such that rotation of the bushing allows the eccentric aperture to become aligned with the mounting opening of a respective connection lug, and wherein the link bar further comprises at least one lock ring which includes an interior circular toothed surface for engagement with the multi-faceted flange of the at least one bushing.

2. The link bar assembly according to claim 1, wherein the at least one lock ring includes a radially extending lobe which defines a locking aperture that is alignable with a receiving aperture defined by the respective connection lug, and a locking bolt assembly operatively inserted in the locking and receiving apertures to positionally lock the lock ring and the at least one bushing relative to the respective connection lug.

3. The link bar assembly according to claim 1, which comprises an opposed pair of the bushings wherein each of the opposed pair of bushings includes a multi-faceted flange and defines an eccentric aperture.

4. The link bar assembly according to claim 3, further comprising a pair of lock rings each of which includes the interior circular toothed surface for engagement with the multi-faceted flange of a respective one of the bushings.

5. The link bar assembly according to claim 4, wherein each of the lock rings includes a radially extending lobe which defines a locking aperture that is alignable with a receiving aperture defined by the respective connection lug, and a locking bolt assembly operatively inserted in the locking and receiving apertures to positionally lock the lock ring and the at least one bushing relative to the respective connection lug.

6. The link bar assembly according to claim 1, wherein the eccentric aperture is an elliptical aperture having major and minor axes.

7. The link bar assembly according to claim 1, wherein the bolt and pin assembly comprises a castle nut, and includes a threaded shank portion on the bolt of the bolt and pin assembly to threadably receive the castle nut.

8. The link bar assembly according to claim 1, wherein the link bar is axially elongate.

9. The link bar assembly according to claim 8, wherein the link bar has a cruciform cross-section.

10. An aircraft which comprises the link bar assembly according to claim 1.

11. An aircraft comprising separated adjacent structural components having respective connection lugs, and a link bar assembly connecting the separated structural components to one another, wherein the link bar assembly comprises:

a link bar having opposed terminal ends which include circular bearings;

bushings operatively received by the circular bearings of the link bar; and a bolt and pin assembly inserted through the bushings to connect the terminal ends of the link bar to a respective one of the connection lugs of the adjacent structural components, wherein at least one of the bushings includes a multi-faceted flange and defines an eccentric aperture such that rotation of the bushing allows the eccentric aperture to become aligned with the mounting opening of a respective connection lug, and wherein the link bar assembly further comprises at least one lock ring which includes an interior circular toothed surface for engagement with the multi-faceted flange of the at least one bushing.

12. The aircraft according to claim 11, wherein the at least one lock ring includes a radially extending lobe which defines a locking aperture that is alignable with a receiving aperture defined by the respective connection lug, and a locking bolt assembly operatively inserted in the locking and receiving apertures to positionally lock the lock ring and the at least one bushing relative to the respective connection lug.

13. The aircraft according to claim 11, wherein the link bar assembly comprises an opposed pair of the bushings wherein each of the opposed pair of bushings includes a multi-faceted flange and defines an eccentric aperture.

14. The aircraft according to claim 13, further comprising a pair of lock rings each of which includes the interior circular toothed surface for engagement with the multi-faceted flange of a respective one of the bushings.

15. The aircraft according to claim 14, wherein each of the lock rings includes a radially extending lobe which defines a locking aperture that is alignable with a receiving aperture defined by the respective connection lug, and a locking bolt assembly operatively inserted in the locking and receiving apertures to positionally lock the lock ring and the at least one bushing relative to the respective connection lug.

16. The aircraft according to claim 11, wherein the eccentric aperture is an elliptical aperture having major and minor axes.

17. The aircraft according to claim 11, wherein the bolt and pin assembly comprises a castle nut, and includes a threaded shank portion on the bolt of the bolt and pin assembly to threadably receive the castle nut.

18. The aircraft according to claim 11, wherein the link bar is axially elongate and has a cruciform cross-section.

\* \* \* \* \*